United States Patent [19]
Smagala-Romanoff

[11] 3,829,133
[45] Aug. 13, 1974

[54] CODED CHECKS AND IN METHODS OF CODING

[76] Inventor: Edward A. Smagala-Romanoff, P.O. Box 16114, West Palm Beach, Fla. 33406

[22] Filed: June 26, 1972

[21] Appl. No.: 266,316

[52] U.S. Cl.................................. 283/6, 283/58
[51] Int. Cl................................... B42d 15/00
[58] Field of Search............... 283/6, 57, 58, 17, 8; 35/24; 282/23

[56] References Cited
UNITED STATES PATENTS

| | | | |
|---|---|---|---|
| 2,155,957 | 4/1939 | Ruth | 35/24 R |
| 2,374,723 | 5/1945 | Barghausen | 283/6 X |
| 3,281,165 | 10/1966 | Edge | 283/6 |
| 3,497,242 | 2/1970 | Seidman | 283/6 |

Primary Examiner—Lawrence Charles
Attorney, Agent, or Firm—Maurice R. Boiteau

[57] ABSTRACT

There is disclosed in the present application a form of check incorporating a masked individual code for each check predictable before unmasking only by the authorized drawer of the check who has advance knowledge of the key by which the individual code for the check is determined. Different drawers are provided with different keys for determining individual check codes.

4 Claims, 4 Drawing Figures

PATENTED AUG 13 1974

3,829,133

CODED CHECKS AND IN METHODS OF CODING

The present invention relates generally to improvements in checks and more particularly to checks including means for assuring the positive identification of the drawer.

With the growth of the volume of checks and of payments made by check, there has been a continuing search for a means by which the authenticity of a signature and the identity of the signer can be positively established. Various expedients have been used such as photographs or fingerprints attached to the checks and to be examined and compared at the time the check is presented. The use of a first signature already on the check to be matched by a second signature at the time of negotiating the check and even a crude form of masked numerical coding of checks have also been employed. However, appearances and signatures can be imitated and the comparison of fingerprints requires a certain degree of expertise on the part of the recipient of the check. The crude codes are applied uniformly to all the checks of a book and are readily destroyed in their effectiveness by a thief who unmasks the code from one check and uses the knowledge thus obtained to negotiate the remainder of the checks.

The need for positive identification of the signer of checks is particularly necessary in forms of checks in which payment is guaranteed by the drawee bank. Such guaranteed checks are highly desirable to assure their broad acceptibility but heretofore the risk of loss to the guarantor bank has been substantial because of the difficulty of positively establishing the identity of the signer or drawer of the check.

It is accordingly an object of the present invention to provide a form of check having built-in proof of the identity of the person signing the check.

Another object is to provide a masked code which varies from one check blank to the other in a book of checks.

Still another object is to provide an identification guarantee system which is both simple and fool-proof for guaranteeing the identity of the signer of a negotiable instrument.

Yet another object is to provide masked check coding which is neither uniform from one check to another of a given book nor from one check book to the other.

A further object is to provide check coding which is both simple and economical to apply.

The foregoing objects are achieved by a personalized check book, a group of checks whether bound together or not but issued to a single depositor. Each of the checks in the book is provided with an individual, masked code number according to a feature of the invention. According to a related feature there is shown on the face of the check a series of numbers from which one having the key, which is simply memorized and need not be carried in written form, may determine the masked code number before unmasking. The key permits a different code number for each of the checks in the book and different sets of codes in check books issued to different depositors since the code numbers of the various check books are based on different keys.

The foregoing objects, features and numerous advantages of the present invention will be more readily understood from a detailed description of illustrative embodiments taken in connection with the accompanying drawings in which.

Figure 1:
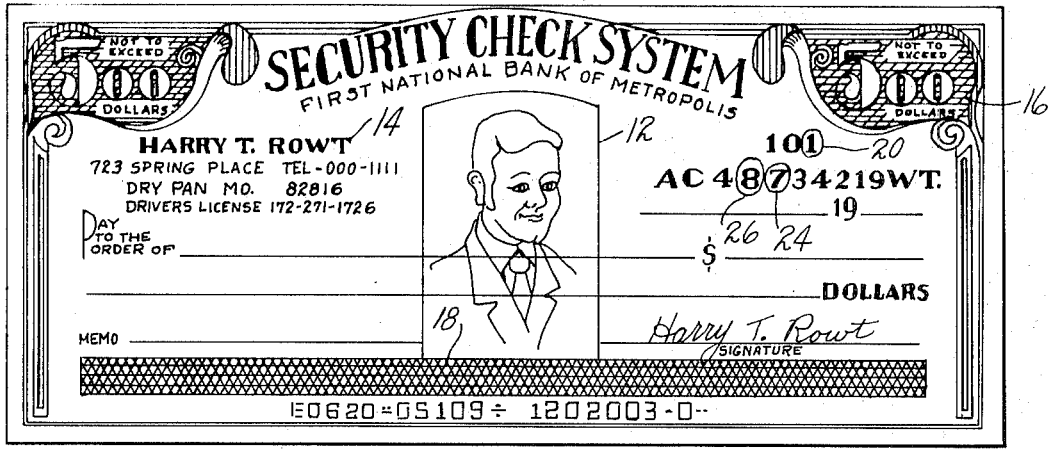
FIG. 1 is a view of a coded check in which a numerical code is covered by a strippable masking material.
Figure 2:
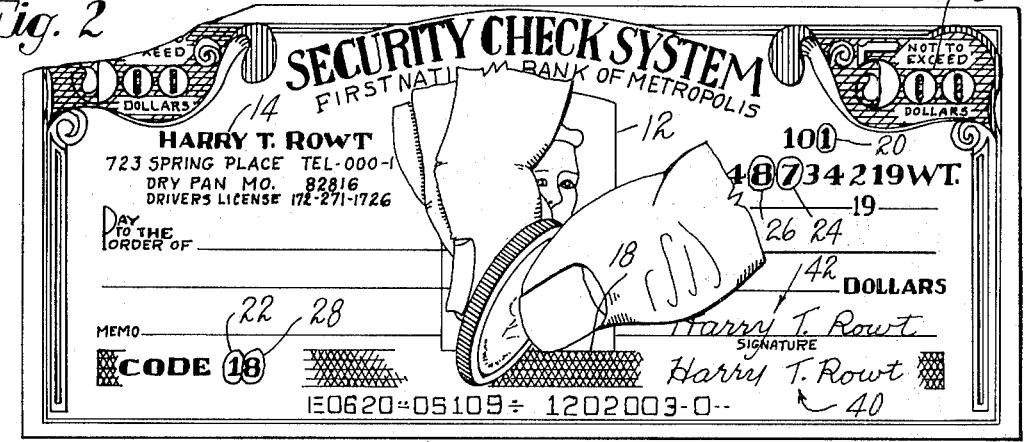
FIG. 2 is a view of the check of FIG. 1 with the mask stripped away.

Referring to the drawings, particularly FIGS. 1 and 2, there is shown a check indicated generally at 10 and having a plurality of more or less conventional security features in addition to a masked code according to the present invention. The check 10 may be imprinted with a photograph 12 and in addition also carry a block of information 14 otherwise identifying the depositor and including his name, address, driver's license number and telephone number. In addition, each check is imprinted with a maximum amount for which the check will be honored such as the 500 dollars imprinted in the corners as at 16. The maximum amount is imprinted in the corners 16 in characters that are not readily altered without leaving a tell-tale sign of the alteration.

A book of checks issued to a depositor in conjunction with a line of credit established by the bank contains checks negotiable for a variety of maximum amounts. The bank guarantees payment of the checks since important additional precautions now to be described are also included for assuring the identity of the signer or drawer. According to the present invention a strippable opaque mask 18 is applied to the check in the form of a broad stripe shown intact on the check of FIG. 1 and partially removed to reveal the priorly concealed information in FIGS. 2 to 4. The mask 18 may conveniently be a thick coating such as is often used to conceal messages in puzzles and games and removable by scraping with a coin as shown in FIG. 2. The mask is preferably patterned so that any tampering to expose the concealed information before the check is presented for payment will be readily discernable.

Beneath the mask 18 is a two character code in which the first character is derived from the last character of the serial number of the check indicated at 20, the numeral 1, corresponding to the first numeral of the code indicated at 22. The second numeral is derived from a key group including an index character indicated at 24, in this case the numeral 7. The key to the code is the positional relationship of the second member with the index character. In the check of FIGS. 1 and 2, the second character of the code would be the number occurring immediately before the index character in the key group, the character indicated at 26, the numeral 8 which becomes the second numeral, 8, indicated in 28 in the check code.

Figure 3:
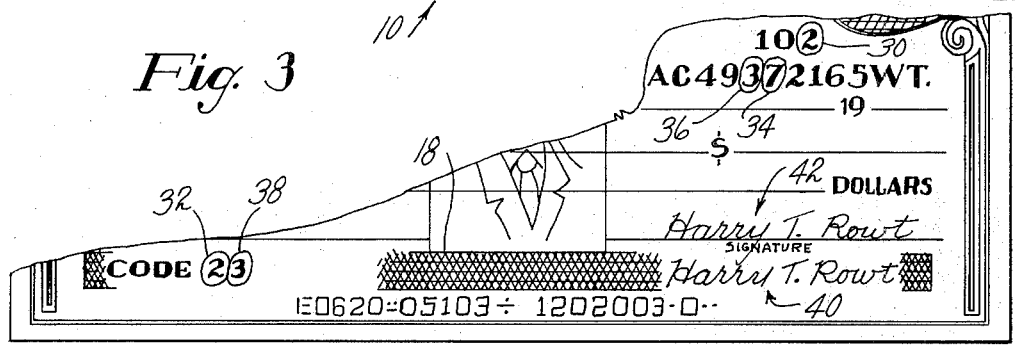
FIG. 3 is a fragmentary view of another check from the same book as the check of FIGS. 1 and 2.

It will be seen from a study of the check of FIG. 3 which is part of a same check book that with the same basic key, the code number is continuously variable from check to check assigned to a given individual. In the set of checks illustrated by FIGS. 1 to 3 inclusive, the code consists of the last number of the check serial number as the first number of the code and the number before the index number as the second number of the code, the index number being 7. The key group of characters and their order on any check is purely random including the index character which need only be in such position in the group that the character having the predetermined relationship to it may be properly located. Thus in the check of FIG. 3, the last numeral of the serial number indicated at 30, the numeral 2, becomes the first character indicated at 32 of the code. The index character is still the 7 indicated at 34 in the code group and the numeral just ahead of the key numeral that indicated at 36, the numeral 3, becomes the second character of the code indicated at 38. It will be appreciated that the circling of characters in the reference group and in the code group is purely for purposes of clarity in the present illustration and that no such indication is provided in an actual blank. In addition to the code, there may be also concealed beneath the mask 18 a printed facsimile signature 40 to be compared to a signature 42 which is applied to the check by the drawer at the time of presenting it as a further means of identifying himself as the proper signer. Thus, basically, the drawer of the check signs in the presence of the recipient while the mask 18 is intact and further informs the recipient that when the mask is stripped, the code number 18 or 23 for the checks of FIGS. 2 and 3 respectively will become visible.

Figure 4:
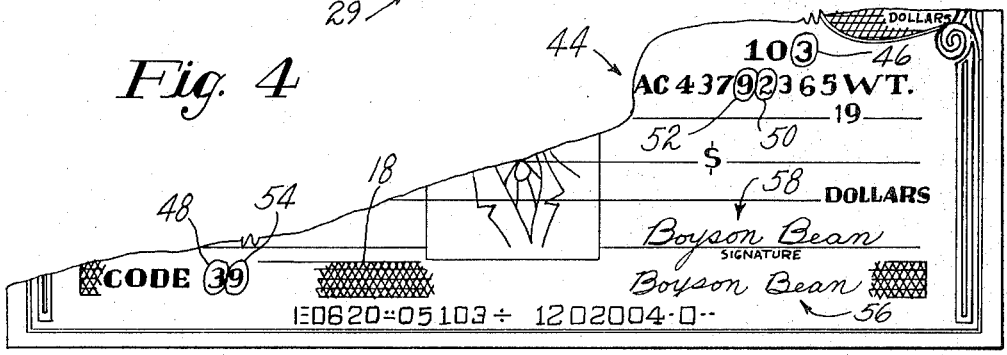
FIG. 4 is a view of a check taken from a book different from the checks of FIGS. 1 to 3 and illustrating the use of a different key for determining a code number.

There is shown in FIG. 4, a check 44 such as would be part of a check book issued to a depositor other than the one receiving the checks of FIGS. 1 to 3 inclusive. In the check 44, the first numeral of the code is also derived from the last numeral indicated at 46, the numeral 3 of the serial number of the check becoming the first numeral indicated at 48 in the code. In this instance, the index number in the key group is indicated at 50 and is the numeral 2. Again, but this condition may vary, the positional arrangement for determining the second numeral of the code is the number immediately preceeding the index character; that indicated at 52, the numeral 9, which becomes the second character indicated at 54 in the code. In addition, a facsimile signature 56 to be matched to the actual signature 58 may also be added beneath the mask 18.

From the foregoing examples, it will be readily appreciated that with simple variations in the key, the different code numbers which may be generated are so great that the code number becomes impossible to determine without unmasking by one who is not in possession of the key information. Obviously, such variations as reversing the derivation from check serial number and key group in the code substantially extends the number of codes available. In such a case, the second number of the code would be derived from the serial number whereas the first number would be derived from the key group. Similarly, the character derived from the key group need not be positioned immediately before the indexed number but may be spaced either ahead or behind the index number. In addition, it is also contemplates that the code group could be extended to three of four numerals, for example, the first and last numeral of the serial number and the numerals occurring before and after the index number in the key group.

While the number of variations from check to check in the same book and from book to book of different depositors is very great, it is readily appreciated that the keys themselves such as "Last number of serial number and number before the 7," are simple for the checkbook owner to remember. Furthermore, and perhaps more importantly, the serial number, code number and random arrangement of numbers including the index number in the key group may be printed in quantities inexpensively by relatively simple equipment automatically programmed for the purpose. The slight added cost of checks is readily recovered by avoiding their fraudulent misuse.

Having thus described my invention, what I claim as new and desire to secure by Letters Patent of the United States is:

1. A set of security check blanks comprising a plurality of check bodies each consisting of a single thickness of paper, removable masking means in the form of a coating applied to a portion of the body, a different code including at least two characters imprinted upon each check body beneath the masking means, and means including indicia on the unmasked portion of each check body comprising a serial number and a key group of characters for determining the masked code.

2. A set of security check blanks according to claim 1 further characterized in that one of the characters of the code on each check body is included in the check serial number and another is included in the key group.

3. A set of security check blanks according to claim 1 further characterized in that the key group on each check body includes an index character and that the code character from the key group bears a predetermined positional relationship to the index character in the key group.

4. A method of coding a check blank consisting of a single thickness of paper comprising the steps of providing a serial number at a first location on the blank check, imprinting at a second location spaced from the first upon the blank a group of characters including an index character and a character having a predetermined key positional relationship to the index character in the group, imprinting at a third location on the blank code characters including one from the serial number and one corresponding to that bearing the predetermined positional relationship with the index character and covering the code character with a coating to provide a removable mask.

* * * * *